Feb. 28, 1933.  K. E. LYMAN  1,899,514
FREE WHEELING TRANSMISSION MECHANISM
Filed Nov. 15, 1930
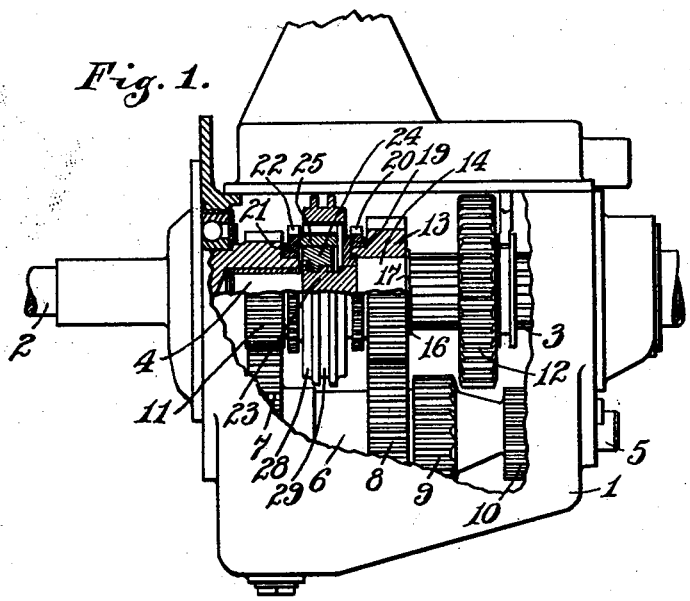
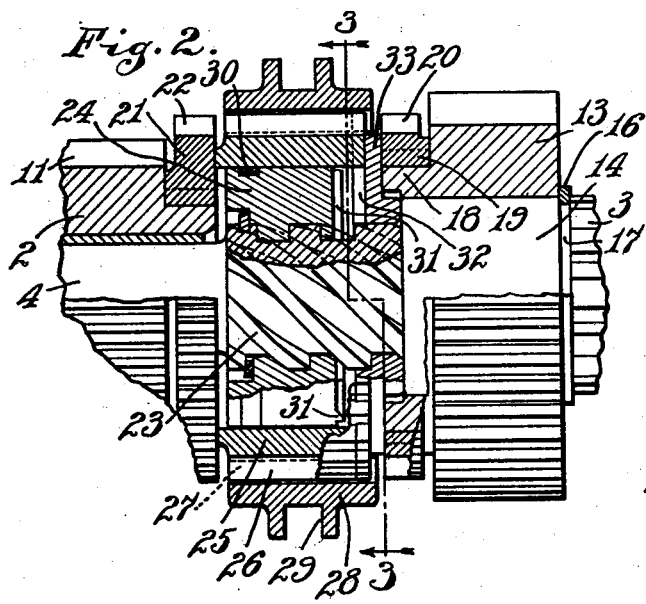
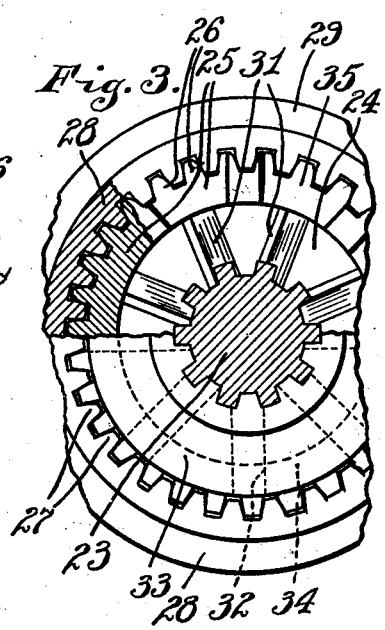
INVENTOR.
Kenneth E. Lyman,
BY
Hood + Hahn.
ATTORNEYS Patented Feb. 28, 1933

1,899,514

UNITED STATES PATENT OFFICE

KENNETH E. LYMAN, OF ROCKFORD, ILLINOIS, ASSIGNOR, BY MESNE ASSIGNMENTS, TO FREE WHEELING PATENTS CORPORATION, OF SOUTH BEND, INDIANA, A CORPORATION OF DELAWARE

FREE WHEELING TRANSMISSION MECHANISM

Application filed November 15, 1930. Serial No. 495,837.

My invention relates to improvements in automobile transmission mechanism and particularly to that type of transmission wherein means are provided for permitting the driven shaft to operate independently of the drive shaft when, under the momentum of the vehicle, the driven shaft operates at a higher speed than the drive shaft.

It is one of the objects of my invention to provide an improved form of apparatus, readily controlled, for accomplishing the above results.

For the purpose of disclosing my invention, I have illustrated one embodiment thereof in the accompanying drawing, in which:

Fig. 1 is a side elevation partially in section of a transmission embodying my invention;

Fig. 2 is a longitudinal sectional view of so much of the transmission as is necessary to illustrate the overrunning clutch; and Fig. 3 is a sectional view on the line 3—3 of Fig. 2.

In the embodiment of the invention illustrated I provide the usual transmission casing 1, in which extends a driving shaft 2, and a driven shaft 3, which driven shaft is preferably piloted in the driving shaft as at 4. I provide also a jack-shaft 5 having mounted thereon a spool 6 provided with a series of gears 7, 8, 9 and 10. The gear 7 meshes with and is driven from a gear 11 formed on the drive shaft 2. The gear 9 is adapted to be meshed with an axially shiftable gear 12 splined on the shaft 3. This gear 12 also meshes with an idler (not shown) in turn meshing with the gear 10 to provide a reverse drive.

The gear 8 is in constant mesh with a gear 13 mounted on a smooth portion 14 of the shaft 3 so that the gear 13 is freely rotatable on the shaft. The gear, however, is held against axial displacement by means of a locking ring 16 fitted in an annular groove 17 formed in the shaft 3. An extension 18 of the hub of the gear 13 has mounted thereon a locking ring 19 having peripheral clutch teeth 20 and provided with internal teeth meshing with teeth on the hub 18 to prevent relative rotation between the ring and the hub. A similar ring 21 having peripheral clutch teeth 22 is mounted on the end of the shaft 2 beyond the gear 11.

A portion of the shaft 3 beyond the portion 14 thereof is screw threaded as at 23 and cooperating with this screw threaded portion is a nut 24. This nut is surrounded by a ring 25 having peripheral teeth 26 to engage with internal teeth 27 on a control collar 28. This control collar is axially shiftable and is provided with an annular groove 29 to receive a shifting fork of transmission shifting mechanism. Between the ring 25 and the nut 24 I arrange a friction or spring ring 30 which provides sufficient friction between the ring 25 and the nut 24 to cause the nut 24 to move with the ring 25 under certain conditions while permitting a relative movement between the two under certain other conditions.

The nut 24 on one face is provided with a series of radial teeth 31 adapted when the nut is moved to its extreme position to the right, looking at Fig. 2, to take into suitable recesses 32 formed in the face of a plate 33 normally rotatably mounted on the shaft 3. These recesses form, between the same a series of face teeth 34 which engage in cooperating recesses 35 in the edge of the ring 25 so that, the plate and ring are locked to rotate together.

The clutch as above constructed constitutes an overrunning clutch for connecting the gear 13 with the shaft 2. Whenever the ring 25 is rotated in a clockwise direction the nut 24, through its frictional engagement with the ring 25, will likewise be rotated on the thread 23 causing the nut to be moved to the right looking at Fig. 2, until the teeth 31 engage in the recesses 32 thereby locking the parts together. If the shaft 3 be driven in a clockwise direction the nut 24 will be backed off or moved to the left disengaging the teeth 31 from the recesses 32 and disconnecting the clutch.

With the above operation in mind assuming that it be desired to drive the shaft 3 from the shaft 2 through the gears 7 and 8, the control member 28 is shifted to the right, looking at Fig. 2, until the teeth 27 mesh with the teeth 20. With the parts thus engaged the ring 25 is rotated in a clockwise direction rotating the nut 24 and advancing the same on its thread until the teeth 31 engage. If during this connection the shaft 3 rotates faster than the speed at which it is being driven through the gear 13, the relative rotation between the shaft and the ring 25 will be reversed so that the ring will tend to rotate the nut 24 in a reverse direction, backing the same off on the shaft 2 and disengaging the teeth 31 from the recesses 32 thereby disconnecting the gear 13 from the shaft. This arrangement therefore provides for an overrunning clutch connection between second gear drive in the transmission. If it be desired to drive the shaft 3 directly from the shaft 2 the control ring 28 is moved to the left, looking at Fig. 2, until the teeth 27 mesh with the teeth 22, when the clutch parts will operate as heretofore described, the shaft 3 being driven in "high", however, instead of in second.

I claim as my invention:

1. The combination with a driving member and a driven member, of a nut threaded on said driven member and forming one member of a clutch, a second clutch member adapted for cooperation with the first clutch member, means axially shiftable independently of said second clutch member for connecting said second clutch member with the driving member, and friction driving means between said first and second clutch members for causing a relative rotation between said nut and said driven member to move said nut into engaging and disengaging position.

2. The combination with a driving member and a driven member, of a nut threaded on said driven member and comprising one member of a clutch, a second clutch member adapted for cooperation with said first clutch member and means axially shiftable independently of the clutch members for connecting said second clutch member with the driving member, said two clutch members being frictionally connected to cause a relative rotation between the driven member and the nut for engaging and disengaging the clutch members.

3. The combination with a driving member and a driven member, of a nut threaded on said driven member having a clutch portion, a clutch member adapted to be connected to said driving member and having a clutch portion adapted for cooperation with said first mentioned clutch portion, means shiftable independently of said clutch portions for connecting said second mentioned clutch portion with the driving member and friction means independent of the clutch portions for imparting a relative rotation between the nut and the driven member.

4. The combination with a driving member and a driven member, of a nut threaded on said driven member having positive clutch teeth, a clutch member having positive clutch teeth for cooperation with the clutch teeth of said nut, means shiftable independently of said second clutch member for connecting said second clutch member with the driving member and friction driving means between the nut and the clutch member for causing a relative rotation between said nut and driven member to move the clutch teeth of the nut and clutch member into engaging and disengaging position.

5. A clutch adapted for use in a transmission which includes a driving shaft, a driven shaft and a gear, said clutch comprising a nut threaded on the driven shaft and forming one member of a clutch, a second clutch member, means shiftable independently of said gear and clutch for selectively connecting said second clutch member to the driving shaft or to said gear and friction means for connecting said nut and said second clutch member.

In witness whereof, I, KENNETH E. LYMAN have hereunto set my hand at Chicago, Ill. this 11th day of November, A. D. one thousand nine hundred and thirty.

KENNETH E. LYMAN.